United States Patent
Hay et al.

(10) Patent No.: US 12,536,115 B2
(45) Date of Patent: Jan. 27, 2026

(54) MULTI-INTERFACE APPARATUS

(71) Applicant: Arm Limited, Cambridge (GB)

(72) Inventors: Timothy Nicholas Hay, Cambridge (GB); Endre Papp, Cambridge (GB); Richard Anthony Lane, Cambridge (GB); Pedro Ochsendorf Portugal, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/820,657

(22) Filed: Aug. 30, 2024

(65) Prior Publication Data
US 2025/0086128 A1    Mar. 13, 2025

(30) Foreign Application Priority Data

Sep. 8, 2023 (GB) ..................... 2313701

(51) Int. Cl.
*G06F 13/24* (2006.01)
(52) U.S. Cl.
CPC .......... *G06F 13/24* (2013.01); *G06F 2213/24* (2013.01)
(58) Field of Classification Search
CPC ........ G06F 13/126; G06F 13/24; G06F 13/26; G06F 13/4068; G06F 2213/24
See application file for complete search history.

(56) References Cited

U.S. PATENT DOCUMENTS

| | | | | |
|---|---|---|---|---|
| 2005/0027914 A1* | 2/2005 | Hammalund | ......... | G06F 9/4812 710/260 |
| 2005/0132096 A1* | 6/2005 | Raghunath | ............ | G06F 1/3215 710/15 |
| 2014/0237150 A1* | 8/2014 | Kurihara | ............... | G06F 9/4812 710/264 |
| 2018/0307845 A1 | 10/2018 | Eckhardt et al. | | |
| 2019/0130486 A1 | 5/2019 | Domodaran et al. | | |
| 2024/0241780 A1* | 7/2024 | Almajan | ................. | G06F 11/10 |
| 2024/0296702 A1* | 9/2024 | Aneja | ................. | G06F 11/0751 |
| 2025/0061000 A1* | 2/2025 | Hildebrand | ........... | G06F 9/5016 |

FOREIGN PATENT DOCUMENTS

EP          1619572 A1    1/2006

OTHER PUBLICATIONS

International Search Report for an International Application No. GB2313701.1 dated Feb. 23, 2024.

* cited by examiner

*Primary Examiner* — Phong H Dang
(74) *Attorney, Agent, or Firm* — NIXON & VANDERHYE P.C.

(57) ABSTRACT

An apparatus comprises a plurality of interfaces, each couplable to a respective one of a plurality of processing circuitries either in a higher criticality compliance state or a lower criticality compliance state. Each interface can receive from its respective processing circuitry interrupt signals destined to a target processing circuitry of the plurality of processing circuitries and transmit to its respective processing circuitry interrupt signals issued by a source processing circuitry of the plurality of processing circuitries. Control circuitry monitors the flow of the interrupt signals and determines whether the flow of interrupt signals exhibits a discrepancy with respect to an expected flow of interrupt signals, and performs a mitigation action in respect of said discrepancy to avoid violation of the higher criticality compliance state.

20 Claims, 9 Drawing Sheets

MULTI-INTERFACE APPARATUS

The present techniques relate to data processing apparatuses. In particular they relate to the provision of an apparatus comprising a plurality of interfaces, each interface configured to be coupled to a respective one of a plurality of processing circuitries.

A contemporary data processing system often comprises multiple instances of processing circuitry, each processing circuitry operating relatively independently of the others although perhaps frequently communicating with them. For example, dedicated processing circuitries may be provided, wherein each processing circuitry has a specialist function and the combination of a set of such heterogeneous processing circuitries can then provide a data processing system with a range of useful capabilities. In some such data processing systems it may be required for at least one of the processing circuitries to meet strict safety rules in terms of its reliability and consistency of operation. Such a processing circuitry may be referred to herein as operable or operating in a higher criticality compliance state. Other processing circuitries may not be required per se to meet the same safety rules due to the nature of the specific data processing that they perform. Such a processing circuitry may be referred to herein as operable or operating in a lower criticality compliance state.

At least some examples provide an apparatus comprising:
a plurality of interfaces, each interface being couplable to a respective one of a plurality of processing circuitries, wherein each processing circuitry is in a higher criticality compliance state or a lower criticality compliance state, each interface being configured to:
receive from its respective processing circuitry interrupt signals destined to a target processing circuitry of the plurality of processing circuitries; and
transmit to its respective processing circuitry interrupt signals issued by a source processing circuitry of the plurality of processing circuitries; and
control circuitry configured to:
monitor flow of said interrupt signals;
determine whether the flow of interrupt signals, between a first processing circuitry of the plurality of processing circuitries and a second processing circuitry of the plurality of processing circuitries, exhibits a discrepancy with respect to an expected flow of interrupt signals; and
responsive to determining a presence of the discrepancy, perform a mitigation action in respect of said discrepancy to avoid violation of the higher criticality compliance state.

At least some examples provide a data processing system comprising:
the plurality of processing circuitries; and
the above-mentioned apparatus.

At least some examples provide a system comprising:
the above-mentioned apparatus or the above-mentioned data processing system, implemented in at least one packaged chip;
at least one system component; and
a board,
wherein the at least one packaged chip and the at least one system component are assembled on the board.

At least some examples provide a chip-containing product comprising the above-mentioned system assembled on a further board with at least one other product component.

At least some examples provide a method of operating an apparatus, wherein the apparatus comprises a plurality of interfaces, the method comprising:
coupling the plurality of interfaces to a respective one of a plurality of processing circuitries, wherein each processing circuitry is in a higher criticality compliance state or a lower criticality compliance state;
at each interface:
receiving from its respective processing circuitry interrupt signals destined to a target processing circuitry of the plurality of processing circuitries; and
transmitting to its respective processing circuitry interrupt signals issued by a source processing circuitry of the plurality of processing circuitries;
in the apparatus:
monitoring flow of said interrupt signals;
determining whether the flow of interrupt signals, between a first processing circuitry of the plurality of processing circuitries and a second processing circuitry of the plurality of processing circuitries, exhibits a discrepancy with respect to an expected flow of interrupt signals; and
when a presence of the discrepancy is determined, performing a mitigation action in respect of said discrepancy to avoid violation of the higher criticality compliance state.

The present techniques will be described further, by way of example only, with reference to embodiments thereof as illustrated in the accompanying drawings, to be read in conjunction with the following description, in which:

FIG. 1 schematically illustrates a data processing system in accordance with some examples;

FIG. 2 is a flow diagram showing a sequence of steps which are taken in the method of some examples;

FIG. 3 schematically illustrates a data processing system in accordance with some examples;

FIG. 4 schematically illustrates a data processing system in accordance with some examples;

FIG. 5 schematically illustrates some components of an apparatus in accordance with some examples;

Figure 8:
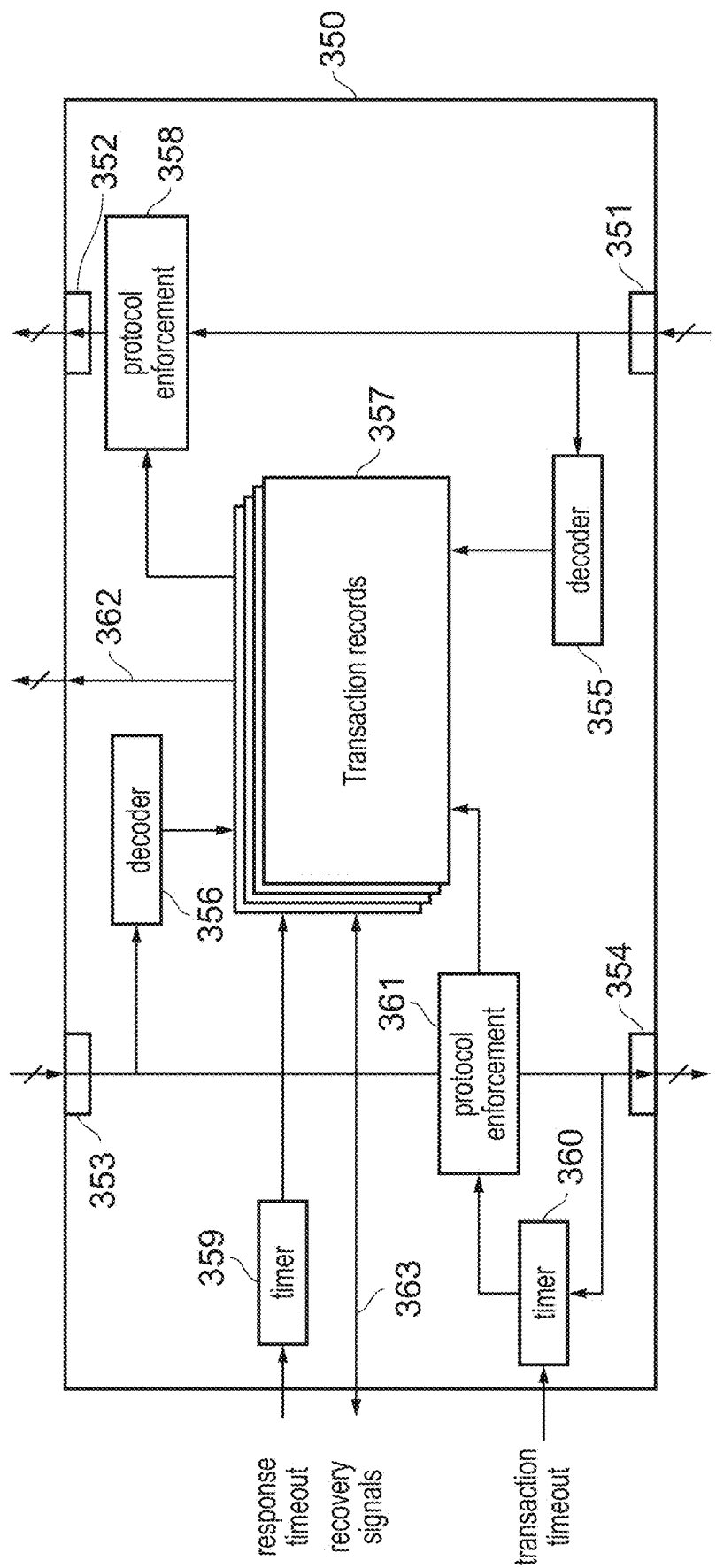
Figure 9:
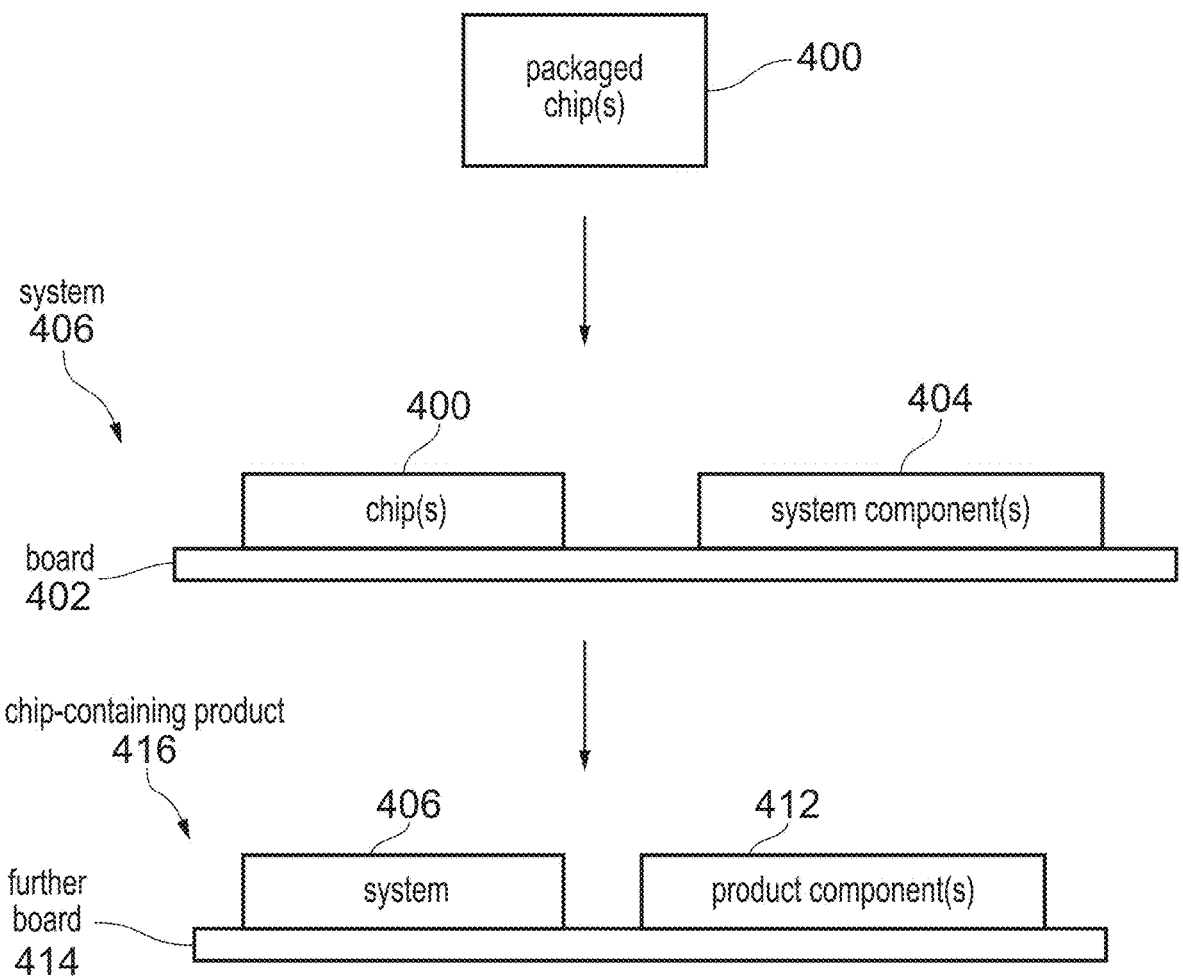

FIG. 8 schematically illustrates some components of an apparatus in accordance with some examples; and FIG. 9 schematically illustrates the implementation of a data processing system in a packaged chip assembled on a board in accordance with some examples and a chip-containing product comprising the data processing system assembled on a further board with at least one other product component in accordance with some examples.

In one example herein there is an apparatus comprising:
a plurality of interfaces, each interface being couplable to a respective one of a plurality of processing circuitries, wherein each processing circuitry is in a higher criticality compliance state or a lower criticality compliance state, each interface being configured to:
receive from its respective processing circuitry interrupt signals destined to a target processing circuitry of the plurality of processing circuitries; and
transmit to its respective processing circuitry interrupt signals issued by a source processing circuitry of the plurality of processing circuitries; and control circuitry configured to:
    monitor flow of said interrupt signals;
    determine whether the flow of interrupt signals, between a first processing circuitry of the plurality of processing circuitries and a second processing circuitry of the plurality of processing circuitries, exhibits a discrepancy with respect to an expected flow of interrupt signals; and
    responsive to determining a presence of the discrepancy, perform a mitigation action in respect of said discrepancy to avoid violation of the higher criticality compliance state.

The present techniques recognise that in a data processing system having a plurality of processing circuitries which are heterogeneous in terms of their criticality compliance there exists the risk that a higher criticality compliance state of one processing circuitry might be jeopardized by virtue of communications which that processing circuitry exchanges with another processing circuitry operating in a lower criticality compliance state. In particular the present techniques address this issue in the context of interrupt signals which are exchanged between a plurality of processing circuitries. An apparatus is provided comprising a plurality of interfaces, each interface being couplable to a respective one of a plurality of processing circuitries. The interfaces receive and transmit interrupt signals from and to the processing circuitries. Control circuitry of the apparatus monitors the interrupt signals and determines whether a discrepancy with respect to an expected flow of the interrupt signals occurs. When this is the case, the control circuitry performs a mitigation action in respect of the discrepancy to avoid violation of the higher criticality compliance state. Where the criticality compliance of the whole data processing system depends on the criticality compliance of its participant components, this approach ensures that the inclusion of components operating in a lower criticality compliance state (components of a lower safety grade) does not degrade the safety of the overall system.

In some examples, each said processing circuitry is switchable between the higher criticality compliance state and the lower criticality compliance state.

In some examples, a first plurality of processing circuitries in the higher criticality compliance state is operable as a single multi-core lockstep processing unit; and/or a second plurality of processing circuitries in the lower criticality compliance state is operable as independent units. The provision of a multi-core lockstep processing unit is a technique for enhancing the reliability of data processing and hence processing circuitries which are carrying out task-critical data processing operations may not only be linked in lock-step, but may also be configured to operate in the higher criticality compliance state. By contrast, processing circuitries which are carrying out non-critical data processing operations may operate independently, since errors which could conceivably occur in the results that they generate are deemed risk-acceptable and these processing circuitries may also be configured to operate in the lower criticality compliance state.

The discrepancy with respect to the expected flow of interrupt signals may take a variety of forms. In some examples the flow of interrupt signals has an associated communication protocol; and the discrepancy is determined as a violation of the communication protocol. In some examples the flow of interrupt signals comprises a flow of packets; and the discrepancy is a deviation from at least one expected property of the flow of packets.

The deviation from the expected property of the flow of packets may take a variety of forms, but in some examples the discrepancy comprises a presence, in the flow of packets, of an unexpected packet. The mitigation action may take a variety of forms, but in some examples the mitigation action comprises at least one of:
    dropping the unexpected packet, such that the unexpected packet is not transmitted to the second processing circuitry; and
    modifying the unexpected packet prior to transmitting the unexpected packet to the second processing circuitry.

In some examples the discrepancy is a lack, in the flow of packets, of an expected packet. The expected packet may be expected in a variety of contexts, but in some examples the expected packet is an expected response, from the first processing circuitry, to an earlier transmission from the second processing circuitry to the first processing circuitry. In some examples the mitigation action comprises substituting the expected packed in the flow of packets with a dummy expected packet.

In some examples the apparatus further comprises:
    an interrupt controller interface, the interrupt controller interface being couplable to an interrupt controller configured to:
    receive the interrupt signals from the plurality of processing circuitries;
    prioritize the interrupt signals;
    and forward the interrupt signals to respective target processing circuitries of the plurality of processing circuitries.

In some such examples, the mitigation action comprises invoking a recovery mode in which:
    the control circuitry signals to the interrupt controller in accordance with the expected flow of interrupt signals; and
    the control circuitry signals to at least one of the plurality of processing circuitries to reboot.

In some such examples, the control circuitry is configured to generate a simulated packet corresponding to the expected packet to send to the interrupt controller, wherein the simulated packet is not sent to the second processing circuitry.

In some examples the discrepancy is a lack of said expected packet within a given time period. In some examples the discrepancy comprises a discrepancy between a packet, of the flow of packets, and an expectation for the packet. In some examples the discrepancy corresponds to a corruption of the packet.

In some examples the mitigation action comprises at least one of:
    dropping the packet such that the packet is not transmitted to the second processing circuitry; and
    modifying the packet prior to transmitting said packet to the second processing circuitry.

In some examples the modifying comprises applying an amendment to said packet that identifies said packet as erroneous.

In some examples the control circuitry is responsive to determining the presence of the discrepancy to signal the presence of said discrepancy.

In some examples the control circuitry is responsive to determining the presence of the discrepancy to trigger a mitigation action in respect of the first processing circuitry. In some examples the mitigation action comprises causing a reboot of the first processing circuitry.

In some examples the first processing circuitry is in the lower criticality compliance state and the second processing circuitry is in the higher criticality compliance state.

In some examples a given interrupt signal corresponds to a plurality of transmissions within said flow; and the control circuitry is configured to determine the presence of said discrepancy based on one of said plurality of transmissions.

In one example herein there is a data processing system comprising:

the plurality of processing circuitries; and the apparatus as described in any of the preceding examples.

In one example herein there is a system comprising:

the apparatus of any of the preceding examples or the data processing system of the preceding example, implemented in at least one packaged chip;

at least one system component; and a board, wherein the at least one packaged chip and the at least one system component are assembled on the board.

In one example herein there is a chip-containing product comprising the system of the preceding example assembled on a further board with at least one other product component.

In one example herein there is a method of operating an apparatus, wherein the apparatus comprises a plurality of interfaces, the method comprising:

coupling the plurality of interfaces to a respective one of a plurality of processing circuitries, wherein each processing circuitry is in a higher criticality compliance state or a lower criticality compliance state;

at each interface:

receiving from its respective processing circuitry interrupt signals destined to a target processing circuitry of the plurality of processing circuitries; and transmitting to its respective processing circuitry interrupt signals issued by a source processing circuitry of the plurality of processing circuitries;

in the apparatus:

monitoring flow of said interrupt signals;

determining whether the flow of interrupt signals, between a first processing circuitry of the plurality of processing circuitries and a second processing circuitry of the plurality of processing circuitries, exhibits a discrepancy with respect to an expected flow of interrupt signals; and when a presence of the discrepancy is determined, performing a mitigation action in respect of said discrepancy to avoid violation of the higher criticality compliance state.

Some particular embodiments are now described with reference to the figures.

Figure 1:
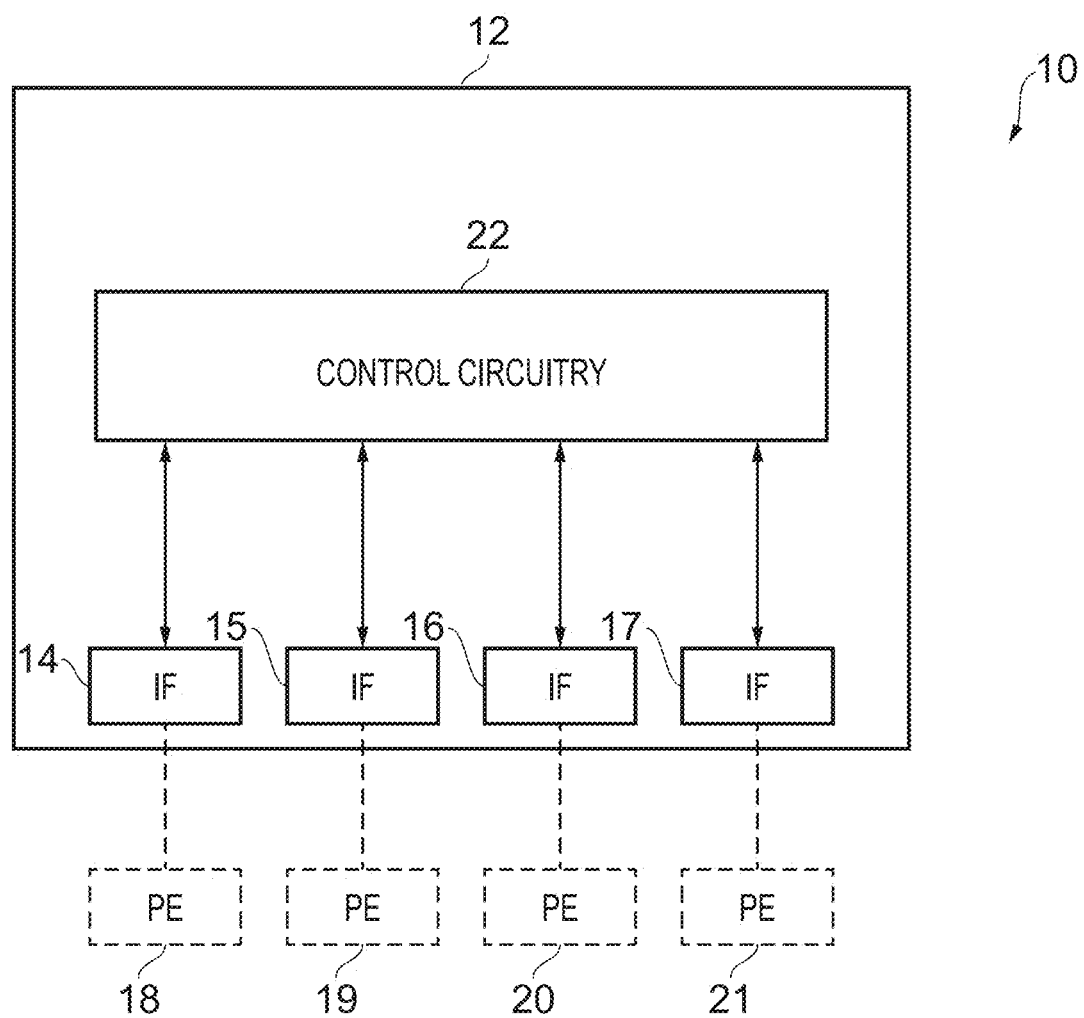

FIG. 1 schematically illustrates a data processing system 10 in accordance with some examples. An apparatus 12 comprises multiple interfaces 14, 15, 16, 17, wherein each interface is provided to couple the apparatus to a respective one of a plurality of processing circuitries (PEs) 18, 19, 20, 21. Note that these PEs and the connections to them are shown as dashed lines in the figures, indicating that the specific subject of the illustration of FIG. 1 is the apparatus 12, to which such PEs may be coupled. These processing circuitries 18, 19, 20, 21 may be provided for the purpose of performing a range of data processing tasks, and the nature of those tasks is not germane to the present techniques, except that there is a heterogeneity amongst the processing circuitries in terms of their criticality compliance. In some contexts this criticality compliance may be referred to as the safety grade of the respective component. Specifically here, the processing circuitries are each operating in either a higher criticality compliance state or a lower criticality compliance state. Here the terms "higher" and "lower" need not be associated with any particular scale of criticality compliance and should be understood as relative terms, i.e. that (at least) two degrees of criticality compliance (or safety grade) are contemplated, one higher than the other. Nevertheless, a specific risk classification system defining such levels of criticality compliance (safety grade) are certainly within the scope of the present techniques, such as the ASIL (Automotive Safety Integrity Level) risk classification system defined by the ISO 26262 standard for the functional safety of road vehicles. This system defines four levels, A, B, C and D, where A represents the lowest degree of criticality and ASIL D represents the highest degree of criticality. Safety-critical systems like anti-lock brakes and airbags require an ASIL-D grade, whilst other components may be grades C, B, or A, depending on their safety/risk categorisation. The apparatus 12 further comprises control circuitry 22. Specifically, the interfaces 14, 15, 16, 17 are each provided to receive interrupt signals from its respective coupled processing circuitry, where an interrupt signal has a target processing circuitry (PE) amongst the plurality of processing circuitries 18, 19, 20, 21. Each of the interfaces 14, 15, 16, 17 are thus also provided to transmit to its respective processing circuitry interrupt signals issued by another source processing circuitry of the plurality of processing circuitries. The interrupt signals are monitored by control circuitry 22 and in particular the control circuitry 22 determines whether a discrepancy in an expected flow of the interrupt signals occurs. When such a discrepancy occurs, the control circuitry 22 performs a mitigation action in respect of the discrepancy. This mitigation action is particularly directed to ensure that compliance with the higher criticality compliance (safety) state of the respective processing circuitry is not violated. Further detail of the nature of such mitigation actions is set out elsewhere herein.

Figure 2:
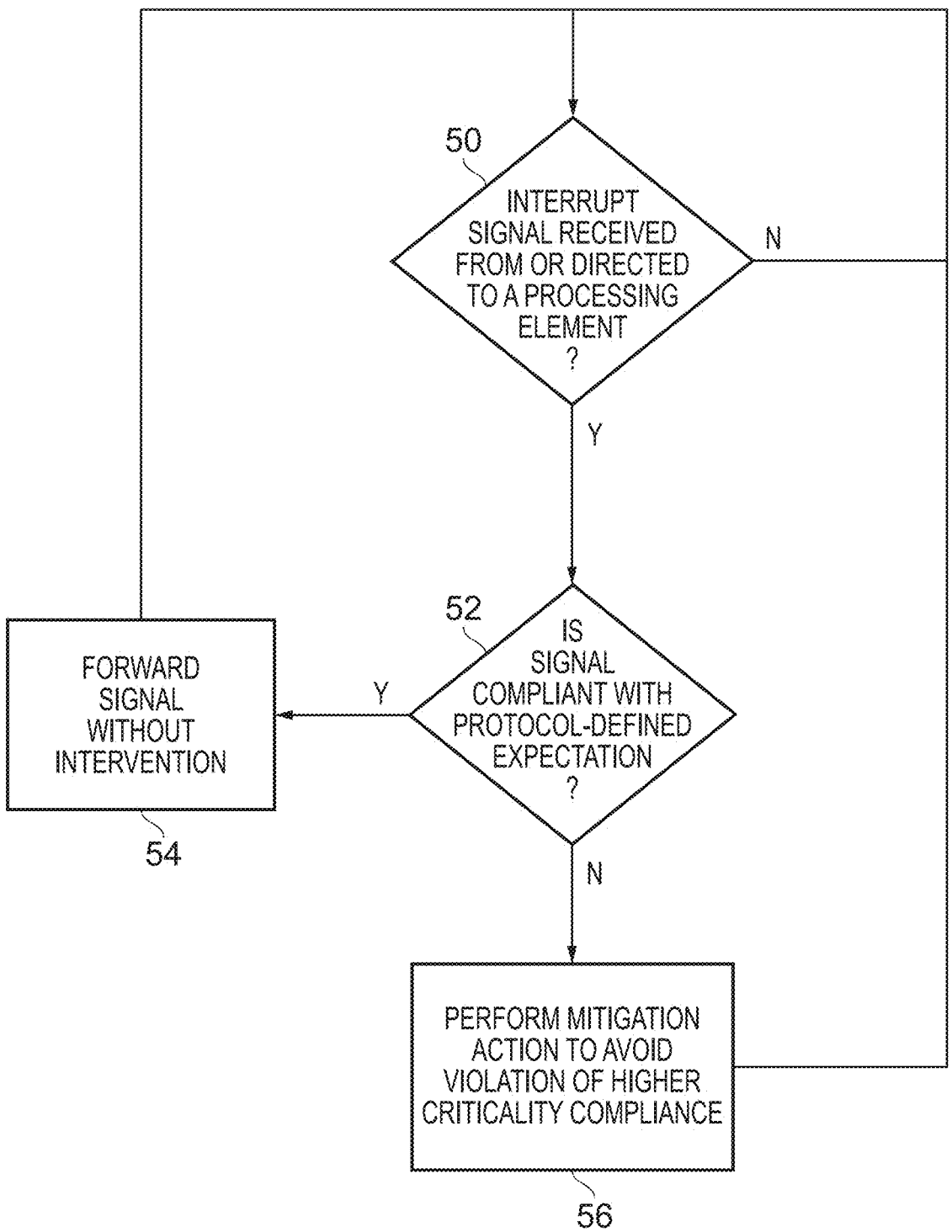

FIG. 2 is a flow diagram showing a sequence of steps which are taken in the method of some examples, showing the broad principle of operation of an apparatus such as 12 shown in FIG. 1. The flow can be considered to begin at step 50, where the flow loops on itself until the apparatus receives an interrupt signal which is either coming from or directed to a particular processing element (circuitry). The flow then proceeds to step 52, where it is determined whether the interrupt signal is compliant with an expectation (i.e. is in accordance with protocol-defined rules for the flow of such interrupt signals—these rules may define or constrain the format of the interrupt signals, the order in which they should be exchanged, their semantic content, and so on). When the received interrupt signal is compliant, the flow proceeds to step 54 and the interrupt signal is simply forwarded without further intervention. The flow then returns to step 50. However, when the received interrupt signal is non-compliant, i.e. a discrepancy has arisen with the expectation, the flow proceeds to step 56 at which a mitigation action is performed to avoid violation of the higher criticality compliance of the relevant processing element.

Figure 3:
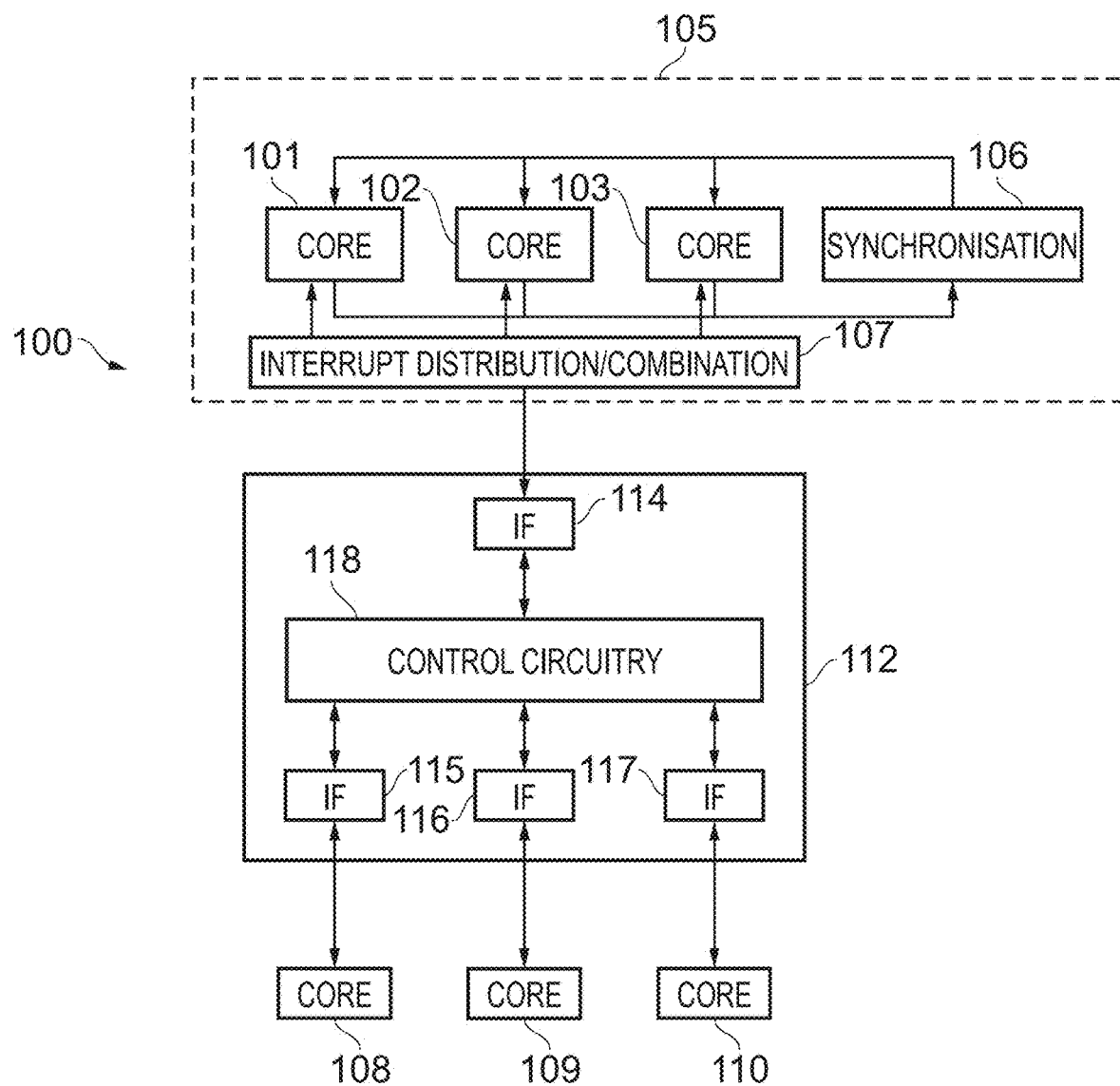

FIG. 3 schematically illustrates a data processing system 100 in accordance with some examples. In this example configuration a plurality of processing circuitries (cores) are shown, where these are presented as two types. A first set of cores 101, 102, 103 are configured to operate as a single multi-core lockstep processing unit 105. That is, these three cores 101, 102, 103 perform exactly the same data processing as one another and a synchronisation unit 106 continually checks that the results of the data processing are the same. Should the results differ at all then mitigation action, warning signals, and so on can be triggered. Note also that of relevance to the present techniques is the fact that interrupt signals received from or sent to the rest of the data processing system 100 are distributed/combined by the interrupt distribution/combination unit 107. Thus in terms of interactions with the other components of the data processing system, the processing unit 105 appears to be a single device. By contrast a second set of cores 108, 109, 110 are each configured to operate as independent units. Thus in total in this example the apparatus 112 is provided with four interrupt interfaces 114, 115, 116, 117. The apparatus 112 further comprises control circuitry 118. It will be understood that the multicore lockstep processing unit 105 is configured in this way because of the criticality of the data processing tasks it performs. On the other hand the second set of cores 108, 109, 110 perform data processing tasks which are less critical. Thus in terms of criticality compliance states, the multicore lockstep processing unit 105 is configured to operate in a higher criticality compliance state (at a high safety grade, e.g. ASIL-D), whereas the second set of cores 108, 109, 110 105 is configured to operate in a lower criticality compliance state (at a lower safety grade, e.g. ASIL-B). As is described in more detail elsewhere herein, the interrupt signals received by and destined for the interfaces 114, 115, 116, 117 are monitored by control circuitry 118. Should the control circuitry 118 determine that a discrepancy in an expected flow of the interrupt signals has occurred, it performs a mitigation action in respect of the discrepancy. This mitigation action is particularly directed to ensure that compliance with the higher criticality compliance (safety) state of the respective processing circuitry is not violated.

Figure 4:
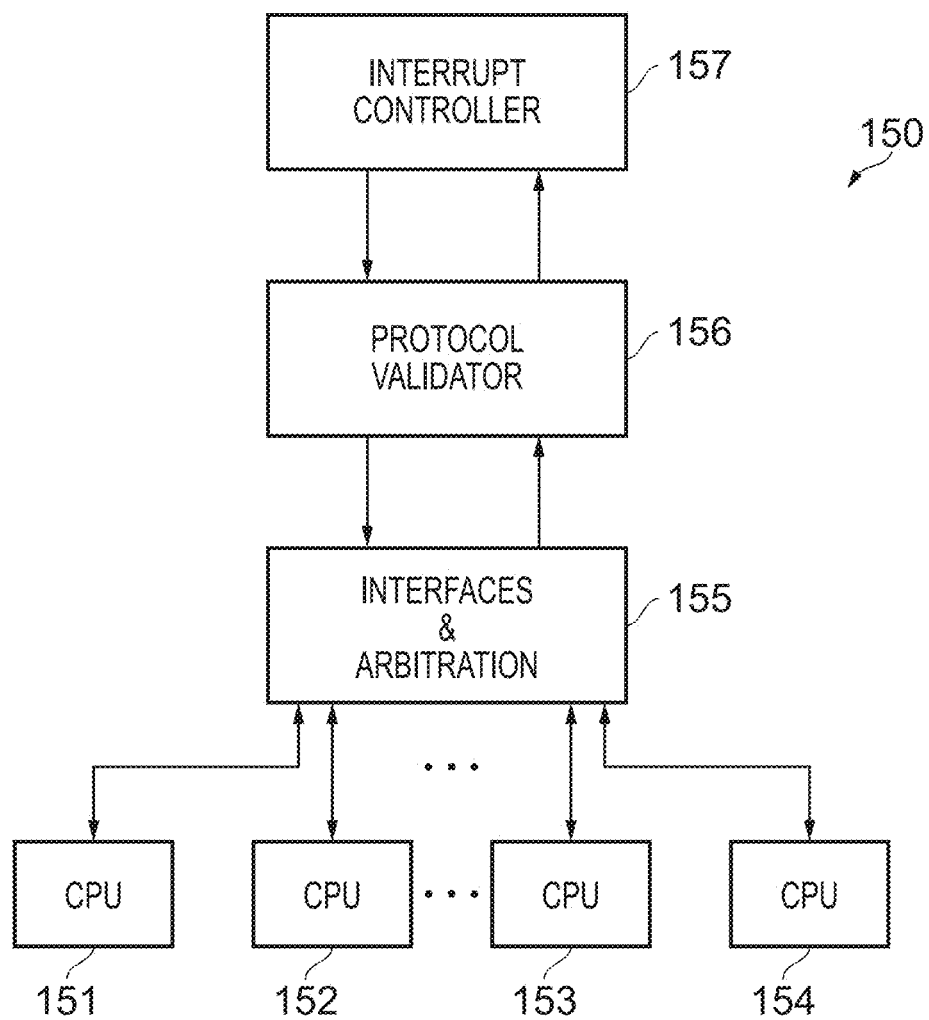

FIG. 4 schematically illustrates a data processing system 150 in accordance with some examples. In this example configuration, four CPUs (processing circuitries) 151, 512, 153, 154 are explicitly shown (although as indicated by the ellipses in the figure, an arbitrary number of CPUs might be provided). In the course of the data processing that they perform, these CPUs issue interrupt signals to one another. In order to correctly prioritize between the various interrupt signals which are exchanged and to allow the system operator to configure which CPUs can interrupt which CPUs at any given time, the system is further provided with an interrupt controller 157. Generally, a Generic Interrupt Controller (GIC) such as this takes interrupts from various system components (peripherals), prioritizes them, and delivers them to the appropriate processor core. A set of interfaces and arbitration logic 155 is also provided which receives incoming interrupt signals from the peripherals (here, the set of CPUs 151-154) and also forwards outgoing interrupt signals to the respective devices. The apparatus provided by the present techniques can therefore be seen to be represented by the protocol validator block 156 in the figure, interposed between the interrupt controller 157 and the set of interfaces and arbitration logic 155. Although the protocol validator block 156 is shown in the figure to have just one upstream and downstream path for its interrupt controller side and its interfaces/arbitration logic side, it will be understood that these are multi-signal paths configured to carry multiple interrupt signals. In the context of the present techniques it will be understood that at least one of the CPUs 151-154 operates in (or can be switched to operate in) a higher criticality compliance state, whilst at least one other of the CPUs 151-154 operates in (or can be switched to operate in) a lower criticality compliance state. For example CPU 151 may be the at least one CPU operating in the higher criticality compliance state (e.g. complying with ASIL-D), whilst CPU 154 may be the CPU operating in the lower criticality compliance state (e.g. complying with ASIL-B). The interposition of the protocol validator block 156 ensures that faults which may occur (and be tolerated there) in the lower criticality CPU 154 do not propagate to the higher criticality CPU 151 and in particular cause a violation of the higher criticality compliance state. Furthermore, depending on the point in the transaction at which the violation occurs, it may be required for the protocol validator block 156 to generate one or more expected further signals (commands) for the sake of the interrupt controller, such that the interrupt controller itself is also not left in a state waiting completion of the transaction.

Figure 5:
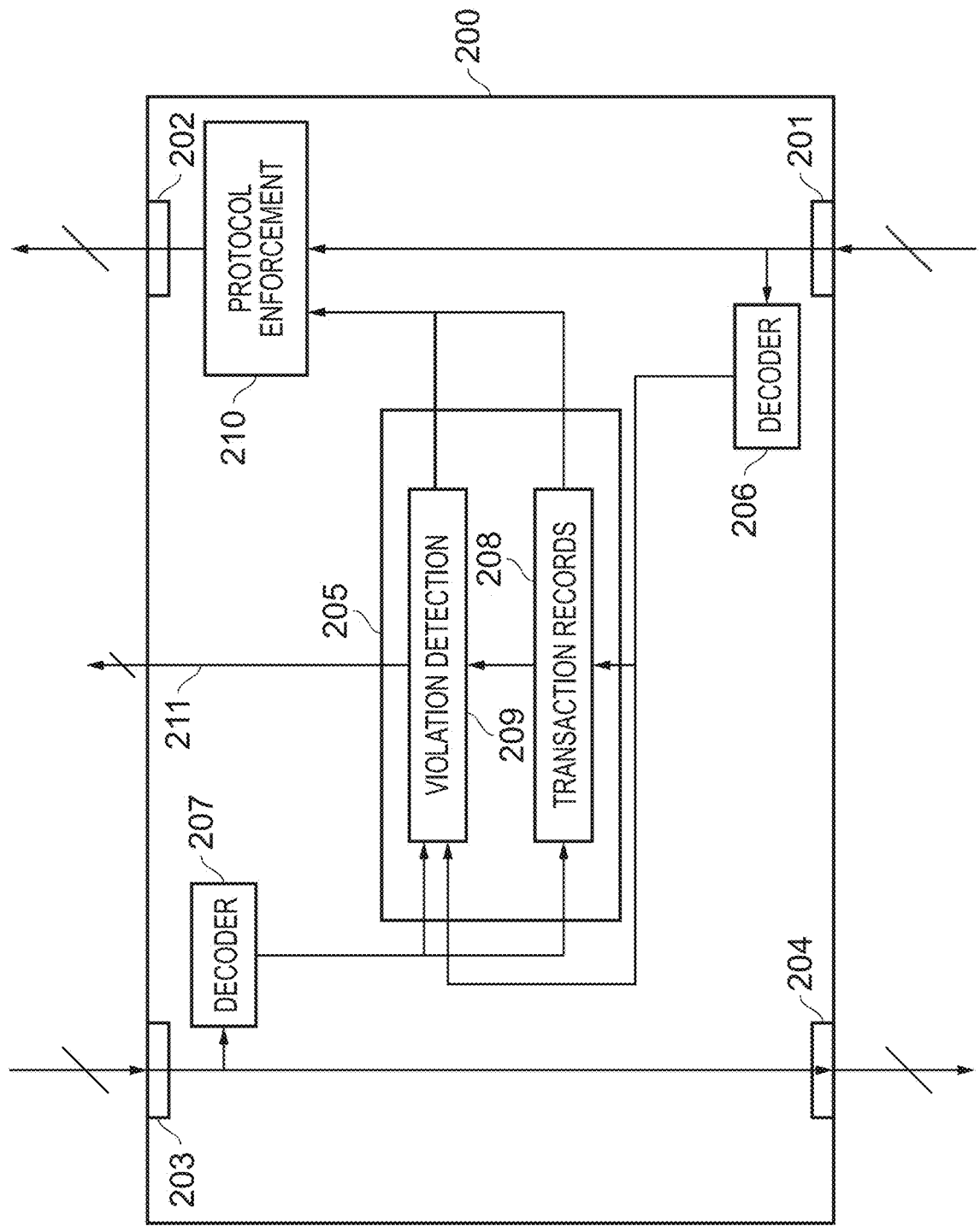

FIG. 5 schematically illustrates some components of an apparatus 200 in accordance with some examples. This may be the configuration of any of: the example apparatus 10 in FIG. 1, the example apparatus 112 in FIG. 3, or the protocol validator 156 in FIG. 4. The apparatus 200 is shown to comprise four interfaces 201, 202, 203, 204 via which interrupt signals are received or transmitted. To take one example usage configuration, the interface 201 may be arranged to receive interrupt signals as issued by one of the processing circuitries in the wider system (not shown), whilst the interface 202 may be arranged to transmit such interrupt signals (possibly modified) to an interrupt controller such as 157 in FIG. 4. Conversely the interface 203 may be arranged to receive interrupt signals as targeted towards one of the processing circuitries by an interrupt controller, whilst the interface 204 may be arranged to transmit such interrupt signals to the respective processing circuitry. Generally, when the system components which exchange interrupt signals are operating normally, the interrupt signals pass through the apparatus 200 transparently, that is, without any modification. However the apparatus 200 monitors the signals it conveys, the oversight of this process being administered by the control circuitry 205. Each of the input interfaces 201, 203 has an associated decoder block 206, 207, which are each configured to extract relevant semantic information from the interrupt signals received and to convey this to the control circuitry 205. Depending on the system configuration, the decoders 206, 207 may only examine part of each data packet, based on a knowledge of which parts of the packet will be used (either by an interrupt controller or by a recipient core) and hence a less processing-intensive decoding can be performed (rather than processing the entire packet). This control circuitry maintains a set of transaction records 208 indicative of interrupt interactions between the participant processing circuitries. Also, violation detection circuitry 209 determines whether the semantic information received from the relevant decoder 206, 207, in combination with the current stage of interrupt interaction indicated by the transaction records 208, is in accordance with an expected flow of the interrupt signals, in particular here whether those signals are in accordance with the communication protocol defining the signals which the participant devices are sending. Thus, to take one example, a given exchange of interrupt signals between two devices in the system may be defined to follow a given sequence according to the communication protocol. Moreover the signals exchanged may be in the form of data packets, where each data packet is characterised by an opcode (defining the type of signal or packet) and some associated data fields. Hence, for a given transaction there can be an expected sequence of packet types exchanged (e.g. first CPU sends packet type A, second CPU acknowledges receipt with packet type B, first CPU sends further packet type C, and second CPU acknowledges receipt with packet type D). The transaction records 208 therefore enable the violation detection circuitry 209 to determine whether this expected sequence has been followed or not. Equally, each of these packet types may be accompanied by associated data and these data may also have an expected content and/or form, depending on the packet type.

The violation detection circuitry 209 is arranged to determine whether each packet type carries the expected content and/or form of data. In the event that the violation detection circuitry 209 determines whether the expected flow of signals has not been followed, the protocol enforcement circuitry 210 is activated in order to perform a mitigation action in respect of the observed violation of the expected flow of signals. This mitigation action may vary, depending on the nature of the discrepancy observed, but the key aim is to ensure that signals are not passed to the CPU operating in the higher criticality compliance state which could compromise that state. Equally, the mitigation action may also or alternatively be focused on an interrupt controller (such as 157 in FIG. 5) such that the interrupt controller can be returned to a clean state with respect to the transaction (and is not left awaiting an uncompleted truncation). The mitigation action may also vary, depending on the stage of the transaction as part of which the discrepancy has been observed. For example, in the event that a discrepancy is observed as a first signal in a transaction between two CPUs, in particular where a signal is firstly received from a lower criticality state CPU which is targeted at a higher criticality state, it may be that a safe mitigation action is simply to suppress that signal. Note that in addition the observance of the discrepancy may nonetheless be reported by the control circuitry 205 and signal line 211 is shown via which this report can be conveyed. Further remedial action may then be triggered as a result of that signal, for example to reboot the CPU which was the source of the discrepancy. However other actions may be taken and indeed may be required, for example in the case that the discrepancy occurs mid-way through a transaction. Here the possibility arises for, say, a transaction to be in progress between a lower criticality state CPU and a higher criticality state CPU, where as a next stage in the transaction the higher criticality state CPU is expected a signal from the lower criticality state CPU. Should the situation then arise that the lower criticality state CPU develops a fault and either does not send the expected signal or sends a malformed signal, the potential arises for this fault to affect the higher criticality state CPU. In such a situation the protocol enforcement circuitry 210 can then either substitute the expected signal in some known, safe format or modify the content of the signal. Indeed the opcode of a substitute signal may be selected to cleanly conclude the transaction with the higher criticality state CPU as promptly as possible, because where the next step for the lower criticality state CPU may be a reboot, there may not be any benefit in attempting to maintain the part-conducted transaction.

Figure 6:
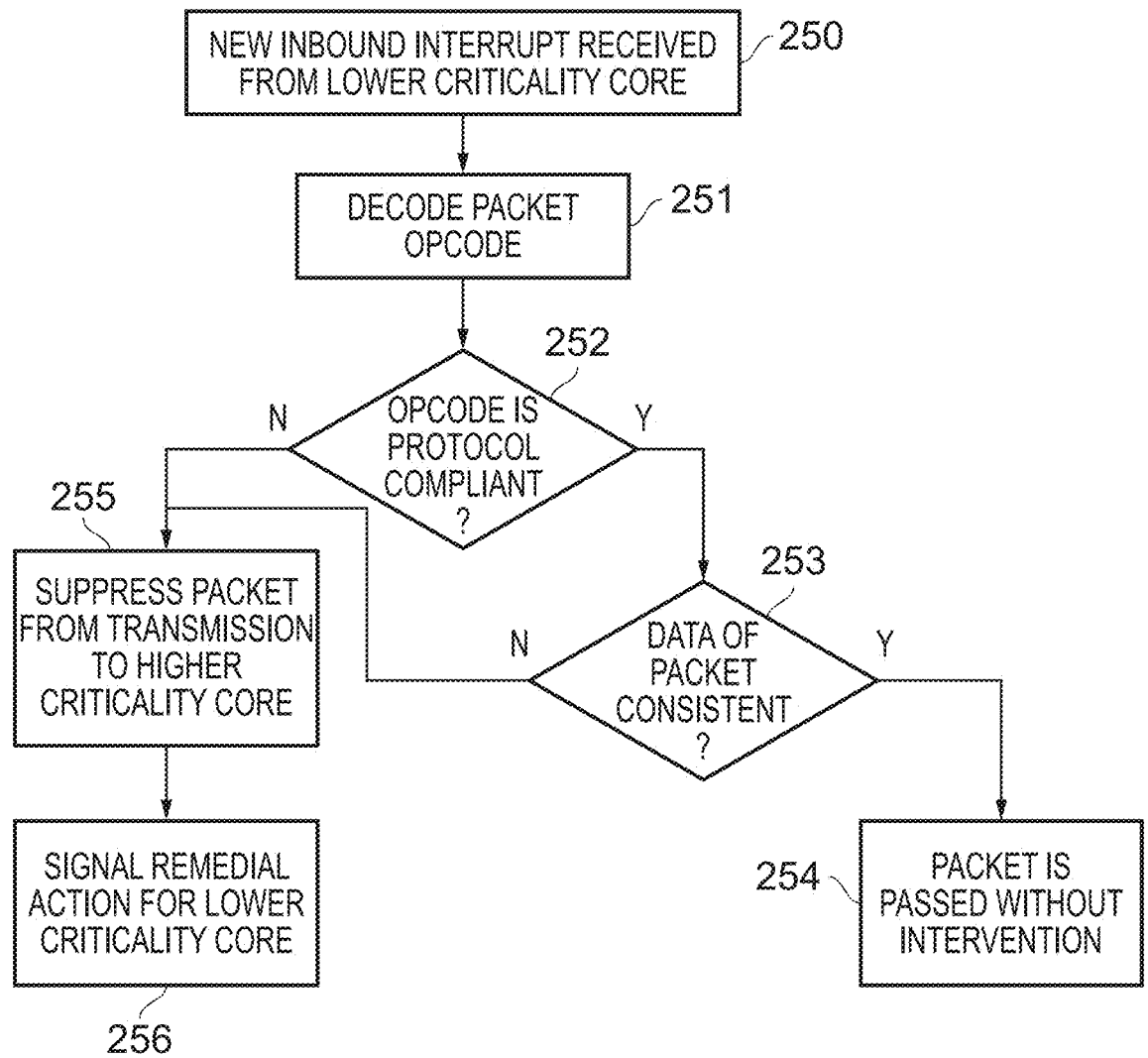
FIG. 6 is a flow diagram showing a sequence of steps which are taken in the method of some examples.

FIG. 6 is a flow diagram showing a sequence of steps which are taken in the method of some examples. In particular these steps may be taken by an apparatus provided in accordance with the present techniques, such as apparatus 10 in FIG. 1, the apparatus 112 in FIG. 3, the protocol validator 156 in FIG. 4, or the apparatus 200 in FIG. 5. These steps begin at step 250 when a new inbound interrupt signal (packet) is received from a lower criticality core which is targeting a higher criticality core. At step 251 the packet opcode is decoded and at step 252 it is determined whether the opcode (i.e. its sematic content) is protocol compliant. If it is, then the flow proceeds to step 253, where it is determined whether the associated data forming part of the packet is also consistent with the communication protocol. When the data content is also protocol compliant, the flow proceeds and concludes at step 254, where this packet is passed without intervention. If however there is a negative determination at either of steps 252 or 253, i.e. either the opcode or the data content of the packet is not protocol compliant, the flow proceeds to step 255, at which (in this example) the packet is suppressed from being further transmitted to the target higher criticality core. Finally at step 256, remedial action is signaled for the lower criticality core (e.g. a reboot).

Figure 7:
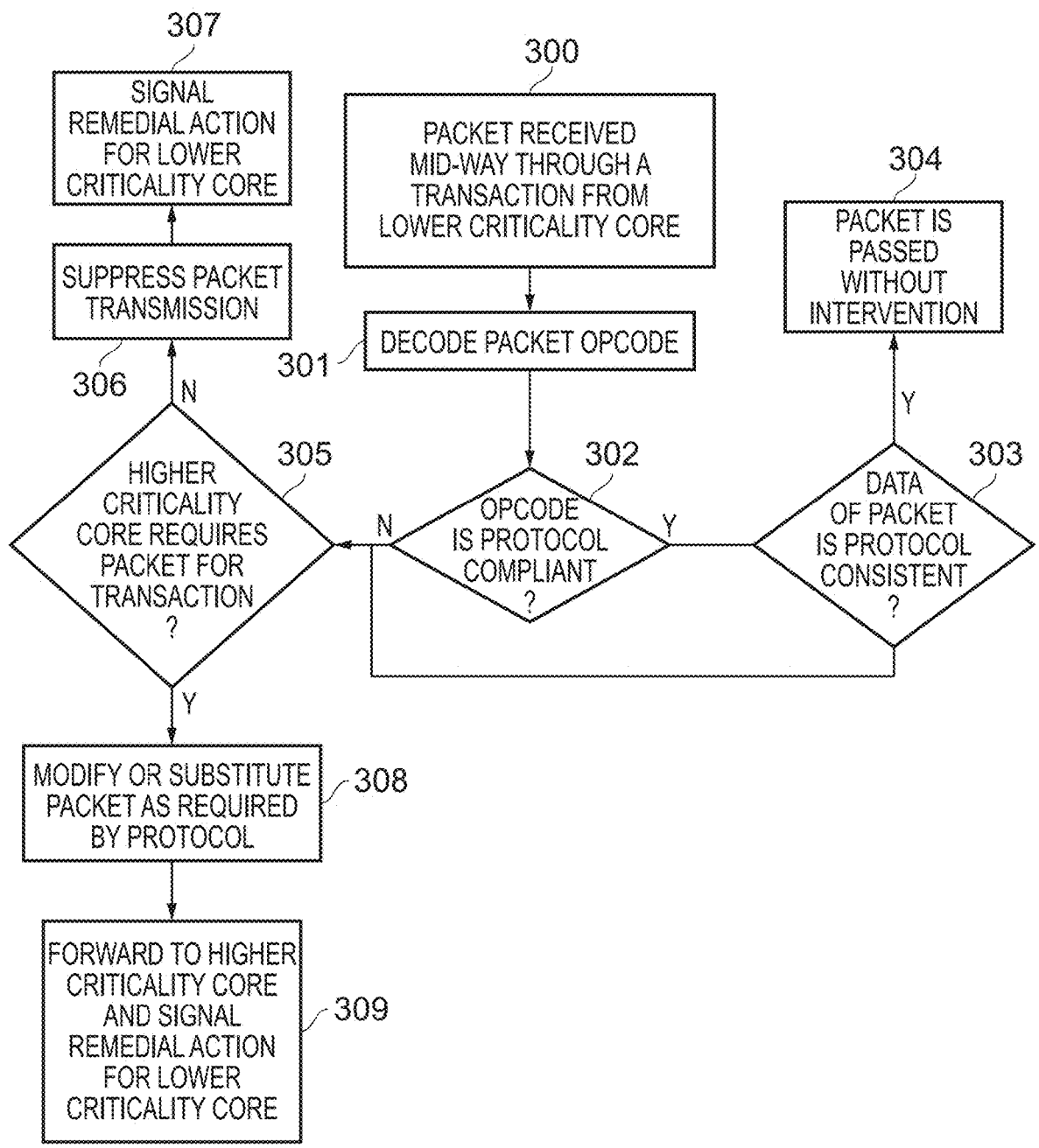
FIG. 7 is a flow diagram showing a sequence of steps which are taken in the method of some examples.

FIG. 7 is a flow diagram showing a sequence of steps which are taken in the method of some examples. These steps may also be taken by an apparatus provided in accordance with the present techniques, such as apparatus 10 in FIG. 1, the apparatus 112 in FIG. 3, the protocol validator 156 in FIG. 4, or the apparatus 200 in FIG. 5. In this example, at the first step 300, the situation is such that an interrupt packet is received from a lower criticality core mid-way through a transaction between that core and another higher criticality core. At step 301 the packet opcode is decoded and at step 302 it is determined whether the opcode (i.e. its sematic content) is protocol compliant. If it is, then the flow proceeds to step 303, where it is determined whether the associated data forming part of the packet is also consistent with the communication protocol. When the data content is also protocol compliant, the flow proceeds and concludes at step 304, where this packet is passed without intervention. If however there is a negative determination at either of steps 302 or 303, i.e. either the opcode or the data content of the packet is not protocol compliant, the flow proceeds to step 305, at which it is determined whether the higher criticality core needs to receive the packet as part of the ongoing transaction. If it does not, the flow proceeds to step 306, at which the packet is suppressed from being further transmitted to the target higher criticality core and at step 307, remedial action is signaled for the lower criticality core (e.g. a reboot). If however, at step 305 it is determined that the higher criticality core does need to receive the (expected) packet as part of the ongoing transaction, then the flow proceeds to step 308 at which the packet is either modified or substituted as appropriate (and in particular in accordance with the protocol) and finally at step 309 the amended packet is forwarded to the higher criticality core. Nonetheless the occurrence of the discrepancy can still also cause remedial action to be signaled for the lower criticality core (e.g. a reboot).

FIG. 8 schematically illustrates some components of an apparatus 350 in accordance with some examples. This apparatus 350 is a variant of the apparatus 200 of FIG. 5 and reference can be made to the description thereof for comparison. This apparatus 350 is shown to comprise four interfaces 351, 352, 353, 354 via which interrupt signals are received or transmitted. As in the case of the apparatus 200 of FIG. 5 these interfaces are respectively arranged to receive interrupt signals as issued by one of the processing circuitries, to transmit such interrupt signals (possibly modified) to an interrupt controller, to receive interrupt signals as targeted towards one of the processing circuitries by an interrupt controller, and to transmit such interrupt signals to the respective processing circuitry. Also here decoders 355, 356 decode the inbound packets and the information derived from that decoding updates and is compared with the set of transaction records 357. Note that protocol violation circuitry is not explicitly shown in FIG. 8, yet can be considered to be present. In the manner described above with reference to FIG. 5, protocol violations are detected and signaled to protocol enforcement circuitry 358 which implements any required remedial action. Additionally, apparatus 350 also comprises two timer blocks 359, 360 which enable the timeliness of interactions to be verified. In particular, the communication protocol for the exchange of interrupt signals may itself define certain time windows within which a transaction must take place and/or within which a participant component must respond to a given signal. Violation of either of these types of limit may therefore also constitute a discrepancy in the expected flow of interrupt signals and the apparatus 350 can then intervene. Note also that in the example of FIG. 8 the apparatus 350 is also provided with protocol enforcement circuitry 361 lying on the path of signals being conveyed in the opposite direction to those for which the protocol enforcement circuitry 358 may intervene. Hence, in this example packets may be suppressed, modified, or substituted which are headed in either direction. As in the case of the apparatus 200 of FIG. 5 a signaling path 362 is provided via which violations of the communication protocol may be reported. Additionally, recovery signals 363 may also be exchanged with the relevant system components, such that recoveries can be triggered when violations are observed with respect to the transaction records 357 and so that the transaction records 357 can be updated when such recoveries are carried out, e.g. to update a transaction tracked as "pending", i.e. part-complete, as "complete" or "cancelled", when it is signaled that a reboot of the relevant system component has been triggered, i.e. that transaction will not complete in the normal manner.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade). As shown in FIG. 9, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Various configurations are asset out in the following numbered clauses.

Clause 1. An apparatus comprising:
    a plurality of interfaces, each interface being couplable to a respective one of a plurality of processing circuitries, wherein each processing circuitry is in a higher criticality compliance state or a lower criticality compliance state, each interface being configured to:
    receive from its respective processing circuitry interrupt signals destined to a target processing circuitry of the plurality of processing circuitries; and transmit to its respective processing circuitry interrupt signals issued by a source processing circuitry of the plurality of processing circuitries; and control circuitry configured to:
monitor flow of said interrupt signals;
determine whether the flow of interrupt signals, between a first processing circuitry of the plurality of processing circuitries and a second processing circuitry of the plurality of processing circuitries, exhibits a discrepancy with respect to an expected flow of interrupt signals; and
responsive to determining a presence of the discrepancy, perform a mitigation action in respect of said discrepancy to avoid violation of the higher criticality compliance state.

Clause 2. The apparatus as defined in Clause 1, wherein each said processing circuitry is switchable between the higher criticality compliance state and the lower criticality compliance state.

Clause 3. The apparatus as defined in Clause 2, wherein:
a first plurality of processing circuitries in the higher criticality compliance state is operable as a single multi-core lockstep processing unit; and/or
a second plurality of processing circuitries in the lower criticality compliance state is operable as independent units.

Clause 4. The apparatus as defined in any preceding Clause, wherein:
the flow of interrupt signals has an associated communication protocol; and
the discrepancy is determined as a violation of the communication protocol.

Clause 5. The apparatus as defined in any preceding Clause, wherein:
the flow of interrupt signals comprises a flow of packets; and
the discrepancy is a deviation from at least one expected property of the flow of packets.

Clause 6. The apparatus as defined in Clause 5, wherein the discrepancy comprises a presence, in the flow of packets, of an unexpected packet.

Clause 7. The apparatus as defined in Clause 6, wherein the mitigation action comprises at least one of:
dropping the unexpected packet, such that the unexpected packet is not transmitted to the second processing circuitry; and
modifying the unexpected packet prior to transmitting the unexpected packet to the second processing circuitry.

Clause 8. The apparatus as defined in any of Clauses 5 to 7, wherein the discrepancy is a lack, in the flow of packets, of an expected packet.

Clause 9. The apparatus as defined in Clause 8, wherein the expected packet is an expected response, from the first processing circuitry, to an earlier transmission from the second processing circuitry to the first processing circuitry.

Clause 10. The apparatus as defined in Clause 8 or Clause 9, wherein the mitigation action comprises substituting the expected packed in the flow of packets with a dummy expected packet.

Clause 11. The apparatus as defined in any preceding Clause, further comprising:
an interrupt controller interface, the interrupt controller interface being couplable to an interrupt controller configured to:
receive the interrupt signals from the plurality of processing circuitries;
prioritize the interrupt signals;
and forward the interrupt signals to respective target processing circuitries of the plurality of processing circuitries.

Clause 12. The apparatus as defined in Clause 11, wherein the mitigation action comprises invoking a recovery mode in which:
the control circuitry signals to the interrupt controller in accordance with the expected flow of interrupt signals; and
the control circuitry signals to at least one of the plurality of processing circuitries to reboot.

Clause 13. The apparatus as defined in Clause 12, when dependent on Clause 8, wherein the control circuitry is configured to generate a simulated packet corresponding to the expected packet to send to the interrupt controller, wherein the simulated packet is not sent to the second processing circuitry.

Clause 14. The apparatus as defined in any of Clauses 8 to 13, wherein the discrepancy is a lack of said expected packet within a given time period.

Clause 15. The apparatus as defined in Clause 5, or in any of Clauses 6 to 14 when dependent on Clause 5, wherein the discrepancy comprises a discrepancy between a packet, of the flow of packets, and an expectation for the packet.

Clause 16. The apparatus as defined in Clause 15, wherein the discrepancy corresponds to a corruption of the packet.

Clause 17. The apparatus as defined in Clause 16, wherein the mitigation action comprises at least one of:
dropping the packet such that the packet is not transmitted to the second processing circuitry; and
modifying the packet prior to transmitting said packet to the second processing circuitry.

Clause 18. The apparatus as defined in Clause 7, or any of Clauses 8 to 17 when dependent on Clause 7, wherein the modifying comprises applying an amendment to said packet that identifies said packet as erroneous.

Clause 19. The apparatus as defined in any preceding Clause, wherein the control circuitry is responsive to determining the presence of the discrepancy to signal the presence of said discrepancy.

Clause 20. The apparatus as defined in any preceding Clause, wherein the control circuitry is responsive to determining the presence of the discrepancy to trigger a mitigation action in respect of the first processing circuitry.

Clause 21. The apparatus as defined in Clause 20, wherein the mitigation action comprises causing a reboot of the first processing circuitry.

Clause 22. The apparatus as defined in any preceding Clause, wherein the first processing circuitry is in the lower criticality compliance state and the second processing circuitry is in the higher criticality compliance state.

Clause 23. The apparatus as defined in any preceding Clause, wherein:
a given interrupt signal corresponds to a plurality of transmissions within said flow; and
the control circuitry is configured to determine the presence of said discrepancy based on one of said plurality of transmissions.

Clause 24. A data processing system comprising:
the plurality of processing circuitries; and
the apparatus as defined in any preceding Clause.

Clause 25. A system comprising:
the apparatus of any of Clauses 1-23 or the data processing system of Clause 24, implemented in at least one packaged chip;
at least one system component; and
a board,
wherein the at least one packaged chip and the at least one system component are assembled on the board.

Clause 26. A chip-containing product comprising the system of Clause 25 assembled on a further board with at least one other product component.

Clause 27. A method of operating an apparatus, wherein the apparatus comprises a plurality of interfaces, the method comprising:
 coupling the plurality of interfaces to a respective one of a plurality of processing circuitries, wherein each processing circuitry is in a higher criticality compliance state or a lower criticality compliance state;
 at each interface:
  receiving from its respective processing circuitry interrupt signals destined to a target processing circuitry of the plurality of processing circuitries; and
  transmitting to its respective processing circuitry interrupt signals issued by a source processing circuitry of the plurality of processing circuitries;
 in the apparatus:
  monitoring flow of said interrupt signals;
  determining whether the flow of interrupt signals, between a first processing circuitry of the plurality of processing circuitries and a second processing circuitry of the plurality of processing circuitries, exhibits a discrepancy with respect to an expected flow of interrupt signals; and
  when a presence of the discrepancy is determined, performing a mitigation action in respect of said discrepancy to avoid violation of the higher criticality compliance state.

In brief overall summary an apparatus is disclosed comprising a plurality of interfaces, each couplable to a respective one of a plurality of processing circuitries either in a higher criticality compliance state or a lower criticality compliance state. Each interface can receive from its respective processing circuitry interrupt signals destined to a target processing circuitry of the plurality of processing circuitries and transmit to its respective processing circuitry interrupt signals issued by a source processing circuitry of the plurality of processing circuitries. Control circuitry monitors the flow of the interrupt signals and determines whether the flow of interrupt signals exhibits a discrepancy with respect to an expected flow of interrupt signals, and performs a mitigation action in respect of said discrepancy to avoid violation of the higher criticality compliance state.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
 a plurality of interfaces, each interface being couplable to a respective one of a plurality of processing circuitries, wherein each processing circuitry is in a higher criticality compliance state or a lower criticality compliance state, each interface being configured to:
 receive from its respective processing circuitry interrupt signals destined to a target processing circuitry of the plurality of processing circuitries; and
 transmit to its respective processing circuitry interrupt signals issued by a source processing circuitry of the plurality of processing circuitries; and
 control circuitry configured to:
  monitor flow of said interrupt signals;
  determine whether the flow of interrupt signals, between a first processing circuitry of the plurality of processing circuitries and a second processing circuitry of the plurality of processing circuitries, exhibits a discrepancy with respect to an expected flow of interrupt signals; and
  responsive to determining a presence of the discrepancy, perform a mitigation action in respect of said discrepancy to avoid violation of the higher criticality compliance state.

2. The apparatus as claimed in claim 1, wherein each said processing circuitry is switchable between the higher criticality compliance state and the lower criticality compliance state.

3. The apparatus as claimed in claim 2, wherein:
 a first plurality of processing circuitries in the higher criticality compliance state is operable as a single multi-core lockstep processing unit; and/or
 a second plurality of processing circuitries in the lower criticality compliance state is operable as independent units.

4. The apparatus as claimed in claim 1, wherein:
 the flow of interrupt signals has an associated communication protocol; and
 the discrepancy is determined as a violation of the communication protocol.

5. The apparatus as claimed in claim 1, wherein:
 the flow of interrupt signals comprises a flow of packets; and
 the discrepancy is a deviation from at least one expected property of the flow of packets.

6. The apparatus as claimed in claim 5, wherein the discrepancy comprises a presence, in the flow of packets, of an unexpected packet or a lack, in the flow of packets, of an expected packet.

7. The apparatus as claimed in claim 6, wherein the mitigation action comprises at least one of:
 dropping the unexpected packet, such that the unexpected packet is not transmitted to the second processing circuitry; and
 modifying the unexpected packet prior to transmitting the unexpected packet to the second processing circuitry.

8. The apparatus as claimed in claim 7, wherein the expected packet is an expected response, from the first processing circuitry, to an earlier transmission from the second processing circuitry to the first processing circuitry.

9. The apparatus as claimed in claim 8, wherein the mitigation action comprises substituting the expected packed in the flow of packets with a dummy expected packet.

10. The apparatus as claimed in claim 1, further comprising:
an interrupt controller interface, the interrupt controller interface being couplable to an interrupt controller configured to:
receive the interrupt signals from the plurality of processing circuitries;
prioritize the interrupt signals;
and forward the interrupt signals to respective target processing circuitries of the plurality of processing circuitries.

11. The apparatus as claimed in claim 10, wherein the mitigation action comprises invoking a recovery mode in which:
the control circuitry signals to the interrupt controller in accordance with the expected flow of interrupt signals; and
the control circuitry signals to at least one of the plurality of processing circuitries to reboot.

12. The apparatus as claimed in claim 11, when dependent on claim 8, wherein the control circuitry is configured to generate a simulated packet corresponding to the expected packet to send to the interrupt controller, wherein the simulated packet is not sent to the second processing circuitry.

13. The apparatus as claimed in claim 1, wherein the discrepancy is at least one of:
a lack of said expected packet within a given time period;
a discrepancy between a packet, of the flow of packets, and an expectation for the packet; and/or
a corruption of the packet.

14. The apparatus as claimed in claim 13, wherein the mitigation action comprises at least one of:
dropping the packet such that the packet is not transmitted to the second processing circuitry; and
modifying the packet prior to transmitting said packet to the second processing circuitry.

15. The apparatus as claimed in claim 7, wherein the modifying comprises applying an amendment to said packet that identifies said packet as erroneous.

16. The apparatus as claimed in claim 1, wherein the first processing circuitry is in the lower criticality compliance state and the second processing circuitry is in the higher criticality compliance state.

17. A data processing system comprising:
the plurality of processing circuitries; and
the apparatus as claimed claim 1.

18. A system comprising:
the data processing system of claim 17, implemented in at least one packaged chip;
at least one system component; and
a board,
wherein the at least one packaged chip and the at least one system component are assembled on the board.

19. A chip-containing product comprising the system of claim 18 assembled on a further board with at least one other product component.

20. A method of operating an apparatus, wherein the apparatus comprises a plurality of interfaces, the method comprising:
coupling the plurality of interfaces to a respective one of a plurality of processing circuitries, wherein each processing circuitry is in a higher criticality compliance state or a lower criticality compliance state;
at each interface:
receiving from its respective processing circuitry interrupt signals destined to a target processing circuitry of the plurality of processing circuitries; and
transmitting to its respective processing circuitry interrupt signals issued by a source processing circuitry of the plurality of processing circuitries;
in the apparatus:
monitoring flow of said interrupt signals;
determining whether the flow of interrupt signals, between a first processing circuitry of the plurality of processing circuitries and a second processing circuitry of the plurality of processing circuitries, exhibits a discrepancy with respect to an expected flow of interrupt signals; and
when a presence of the discrepancy is determined, performing a mitigation action in respect of said discrepancy to avoid violation of the higher criticality compliance state.

* * * * *